(12) United States Patent
Kapoor et al.

(10) Patent No.: US 11,823,272 B2
(45) Date of Patent: Nov. 21, 2023

(54) INVESTMENT TRANSACTION ENRICHMENT PROCESS USING TRANSACTION TO HOLDINGS MATCHING

(71) Applicant: Yodlee, Inc., San Mateo, CA (US)

(72) Inventors: Rohit Kapoor, Bengaluru (IN); Swapnil Shashank, Patna (IN); Dhvanit Trivedi, Sai Vihar Society (IN); Chris Reynolds, Raleigh, NC (US); Kaalinga Muralik Kannan D, Flat No (IN)

(73) Assignee: YODLEE, INC., San Mateo, CA (US)

( * ) Notice: Subject to any disclaimer, the term of this patent is extended or adjusted under 35 U.S.C. 154(b) by 0 days.

(21) Appl. No.: 17/368,611

(22) Filed: Jul. 6, 2021

(65) Prior Publication Data
US 2023/0009646 A1    Jan. 12, 2023

(51) Int. Cl.
| | |
|---|---|
| G06Q 40/06 | (2012.01) |
| G06Q 40/02 | (2023.01) |
| G06F 16/2457 | (2019.01) |
| G06Q 40/12 | (2023.01) |
| G06Q 30/018 | (2023.01) |

(52) U.S. Cl.
CPC ....... *G06Q 40/06* (2013.01); *G06F 16/24578* (2019.01); *G06Q 30/018* (2013.01); *G06Q 40/02* (2013.01); *G06Q 40/12* (2013.12)

(58) Field of Classification Search
None
See application file for complete search history.

(56) References Cited

U.S. PATENT DOCUMENTS

| | | | |
|---|---|---|---|
| 7,853,513 B1* | 12/2010 | Lora | G06Q 40/00 705/37 |
| 2006/0089898 A1* | 4/2006 | Durkin | G06Q 40/04 705/37 |
| 2015/0073949 A1* | 3/2015 | Armstrong | G06Q 40/12 705/30 |
| 2017/0364552 A1* | 12/2017 | Pattanaik | G06F 16/2365 |
| 2022/0035792 A1* | 2/2022 | Gschwind | G06F 16/24558 |
| 2022/0121649 A1* | 4/2022 | Jin | G06N 3/045 |

FOREIGN PATENT DOCUMENTS

JP    2013544390 A    * 12/2013

* cited by examiner

*Primary Examiner* — Ariel J Yu
(74) *Attorney, Agent, or Firm* — Zilka-Kotab, P.C.

(57) ABSTRACT

As described herein, a system, method, and computer program are provided for investment transaction enrichment using transaction to holdings matching. In use, data defining an investment transaction identified. Additionally, the data is used to automatically match the investment transaction to a particular holding. Further, the data is enriched with one or more attributes of the particular holding.

16 Claims, 15 Drawing Sheets

Transaction Record

| Description | Transformed Description | Units | Price | Amount | Trans Date | CUSIP | Ticker |
|---|---|---|---|---|---|---|---|
| Global Min Vol Investor - Exchange from | Global Minimum Volatility | -3.455 | 14.47 | -50 | 05-20-2021 | ? | ? |

FIG. 9A

Price Match

| | Position 1 | Position 2 | Position 3 | Position 4 |
|---|---|---|---|---|
| | ✗ | ✓ | ✓ | ✗ |
| Description | VANG SHORT-TERM TX-EX FD INV SHS | VANG GLBL MIN VOL FD INV SHS | VANG INTERM-TERM TX-EX FD INV SHS | VANG 500 IDX FD ADM SHS |
| Transformed description | vanguard short-term tax-exempt fund investor shares | vanguard global minimum volatility fund investor shares | vanguard intermediate-term tax-exempt fund investor shares | vanguard500 index fund admiral shares |
| As of date | 05-21-2021 | 05-20-2021 | 05-20-2021 | 05-20-2021 |
| Day-Over-Day Unit Change | 4.894 | -19.004 | -7.37 | 0.1299 |
| Price | 15.93 | 14.47 | 14.81 | 384.63 |
| CUSIP | 922907100 | 922907100 | 922907209 | 922908710 |
| Ticker | VWSTX | VWSTX | VWITX | VFIAX |

FIG. 9B

Unit Match

| Position 2 | | Position 3 | |
|---|---|---|---|
| Description | VANG GLBL MIN VOL FD INV SHS | Description | VANG INTERM-TERM TX-EX FD INV SHS |
| Transformed description | vanguard global minimum volatility fund investor shares | Transformed description | vanguard intermediate-term tax-exempt fund investor shares |
| As of date | 05-20-2021 | As of date | 05-20-2021 |
| Day-Over-Day Unit Change | -19.004 | Day-Over-Day Unit Change | -7.37 |
| Price | 14.47 | Price | 14.81 |
| CUSIP | 922907100 | CUSIP | 922907209 |
| Ticker | VWSTX | Ticker | VWITX |

FIG. 9C

Description Match

| Position 2 | | Position 3 | |
|---|---|---|---|
| Description | VANG GLBL MIN VOL FD INV SHS | Description | VANG INTERM-TERM TX-EX FD INV SHS |
| Transformed description | vanguard global minimum volatility fund investor shares | Transformed description | vanguard intermediate-term tax-exempt fund investor shares |
| As of date | 05-20-2021 | As of date | 05-20-2021 |
| Day-Over-Day Unit Change | -19.004 | Day-Over-Day Unit Change | -7.37 |
| Price | 14.47 | Price | 14.81 |
| CUSIP | 922907100 | CUSIP | 922907209 |
| Ticker | VWSTX | Ticker | VWITX |

FIG. 9D

Transformed transaction record

| Scraped Description | Units | Price | Amount | Trans Date | CUSIP | Ticker | Trans Type | Enriched Description |
|---|---|---|---|---|---|---|---|---|
| Global Min Vol Investor - Exchange from | -3,455 | 14.47 | -50 | 05-20-2021 | 922907100 | VWSTX | Sell | VANGUARD GLOBAL MINIMUM VOLATILITY FUND INVESTOR SHARES |

FIG. 9E

INVESTMENT TRANSACTION ENRICHMENT PROCESS USING TRANSACTION TO HOLDINGS MATCHING

FIELD OF THE INVENTION

The present invention relates to data enrichment processes.

BACKGROUND

Accurate, enriched data is the foundation for successful data analysis, business decisions, investment advice, portfolio accounting and more. This is particularly true for transactional data, such as investment transaction records. Oftentimes, however, critical data, such as security identifiers, are unclear or even missing outright in the transactional data, and especially when the transactional data is in the form of aggregated investment transactions. This negatively impacts processes that rely on complete transactional data, such as portfolio accounting, compliance tracking, trade reconciliation, etc.

There is thus a need for addressing these and/or other issues associated with the prior art.

SUMMARY

As described herein, a system, method, and computer program are provided for investment transaction enrichment using transaction to holdings matching. In use, data defining an investment transaction identified. Additionally, the data is used to automatically match the investment transaction to a particular holding. Further, the data is enriched with one or more attributes of the particular holding.

BRIEF DESCRIPTION OF THE DRAWINGS

FIGS. 9A-E illustrate an exemplary implementation of investment transaction enrichment using transaction to holdings matching, in accordance with one embodiment.

DETAILED DESCRIPTION

Figure 1:
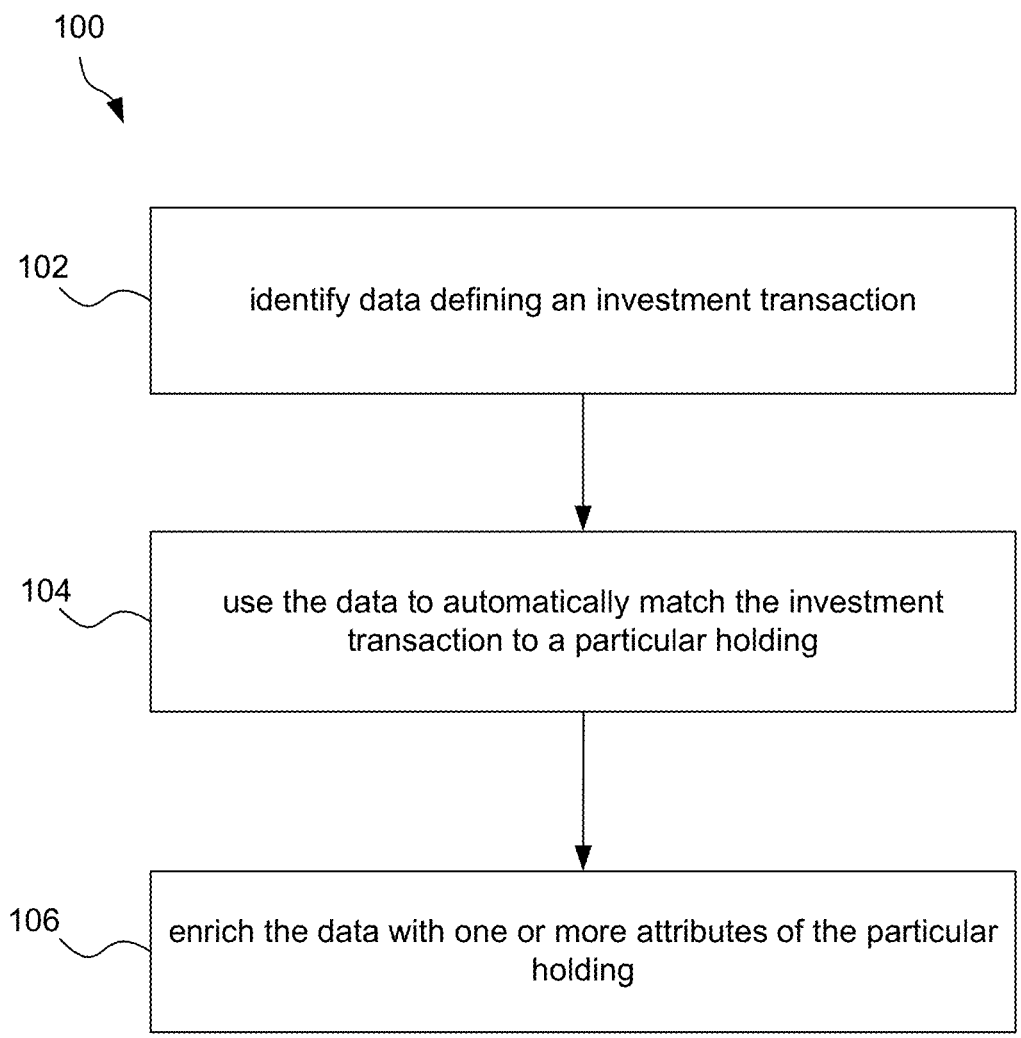
FIG. 1 illustrates a method for investment transaction enrichment using transaction to holdings matching, in accordance with one embodiment.

FIG. 1 illustrates a method 100 for investment transaction enrichment using transaction to holdings matching, in accordance with one embodiment. The method 100 may be performed any computer system, such as those described below with respect to FIGS. 10 and/or 11. For example, the method 100 may be performed by a computer system interfacing a system of a financial institution that generates investment transaction data and another system independent of the financial institution that uses the investment transaction data for any analysis purposes, such as portfolio accounting, compliance tracking, trade reconciliation, etc. The computer system performing the method 100 may be a sub-system of the financial institution, a sub-system of the other system performing the analysis process(es). The method 100 is performed to enrich the investment transaction data (e.g. generated by the financial institution) in real time, which may thereby provide better quality investment transaction data for use by the analysis process(es).

In operation 102, data defining an investment transaction identified. The investment transaction refers to any transaction (e.g. purchase or sale) of an investment asset, such as options, bonds, money market funds, etc. The data defining the investment transaction may be any data defining one or more parameters (e.g. aspects, characteristics, etc.) of the investment transaction, such as values for the parameter(s) of the investment transaction. Examples of the parameters may be a description of the investment transaction, a number of units included in the investment transaction, a price for each of the units, an amount associated with the investment transaction, and/or a date on which the investment transaction occurred.

In one embodiment, the data may be a record created for the investment transaction. In another embodiment, the data may be included in an aggregated investment transaction. Further, the data may be identified from any source having (e.g. storing, transmitting, etc.) the data. In one embodiment, the data may be identified from a data structure of a financial institution or other entity through which the investment transaction was performed. In another embodiment, the data may be identified responsive to receipt of a data feed (including the data) from a financial institution or other entity through which the investment transaction was performed.

As an option, it may be determined that the data is missing certain information, values, etc. For example, it may be determined that the data is missing a value or other entry for one or more parameters of the investment transaction. As another example, in the context of an investment transaction record, it may be determined that values are missing in one or more fields of the record. The missing portion of the data may refer to a Committee on Uniform Securities Identification Procedures (CUSIP) number that identifies a North American financial security, a ticker identifier which is unique identifier assigned to a security traded on a particular market, etc. With respect to this option, the method 100 may only proceed when it is determined that the data is missing certain information. As another option, even when the record is not missing certain information (e.g. the record has security identifiers), the method 100 may proceed to validate the aggregated securities.

In operation 104, the data is used to automatically match the investment transaction to a particular holding. In the context of the present description, a holding refers to some content within an investment portfolio or investment account of an entity. Thus, the holding may correspond to an investment asset owned by the entity. A "holding" may also be referred to herein as a "security" or a "position."

Using the data to automatically match the investment transaction to a particular holding may include applying one or more matching algorithms to the data to determine one or more potential holdings to which the investment transaction corresponds. The potential holdings may be determined from a plurality of holdings (e.g. current and/or past) of an entity for which the investment transaction was performed.

The matching algorithm(s) may be applied to any value(s) included in the data for any parameter(s) of the investment transaction, as required by the matching algorithm(s). The matching algorithms may employ pattern matching functions, fuzzy matching functions, or any other match-based functions.

In one embodiment, a matching algorithm of the one or more matching algorithms may use an existing description in the data to determine the one or more potential holdings to which the investment transaction corresponds. In another embodiment, a matching algorithm of the one or more matching algorithms may use at least an existing price value in the data and an existing unit value in the data to determine the one or more potential holdings to which the investment transaction corresponds. In yet another embodiment, a matching algorithm of the one or more matching algorithms may use an existing security identifier in the data to determine the one or more potential holdings to which the investment transaction corresponds.

As an option, each matching algorithm may return zero or more potential holdings each with a corresponding similarity score. The particular holding that is automatically matched to the investment transaction may be one of the one or more potential holdings with a highest similarity score. Of course, the particular holding that is automatically matched to the investment transaction may be selected from the potential holdings according to any defined criteria.

In operation 106, the data is enriched with one or more attributes of the particular holding. Enriching the data may refer to adding the one or more attributes of the particular holding to the data, in one embodiment. In another embodiment, enriching the data may refer to inserting the one or more attributes of the particular holding in existing fields of the data. In one example, one or more attributes of the particular holding that are used to enrich the data may be selected based on a determination that the one or more attributes are missing from the data.

As an option, a correlation between existing values in the data (e.g. that are associated with one or more parameters of the investment transaction) and the one or more attributes of the particular holding may be stored in a map data structure. The correlation may be stored such that when additional data is identified that defines an additional investment transaction and that has values for the one or more parameters that match the existing values stored in the map data structure, then the additional data may be automatically enriched with the one or more attributes stored in the map data structure, based on the correlation. Thus, the map data structure may be used to avoid running the matching algorithms when possible.

As a further option, the enriched data may be output for processing. For example, the enriched data may be output to another system (e.g. independent of the financial institution as described above) for performing any processing on the enriched data. The processing may include, for example, portfolio accounting, compliance tracking, trade reconciliation, or any other analysis. To this end, any processes applied to the enriched data may be improved (e.g. accuracy, completeness, etc.) by virtue of the enrichment of the data provided using the method 100.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
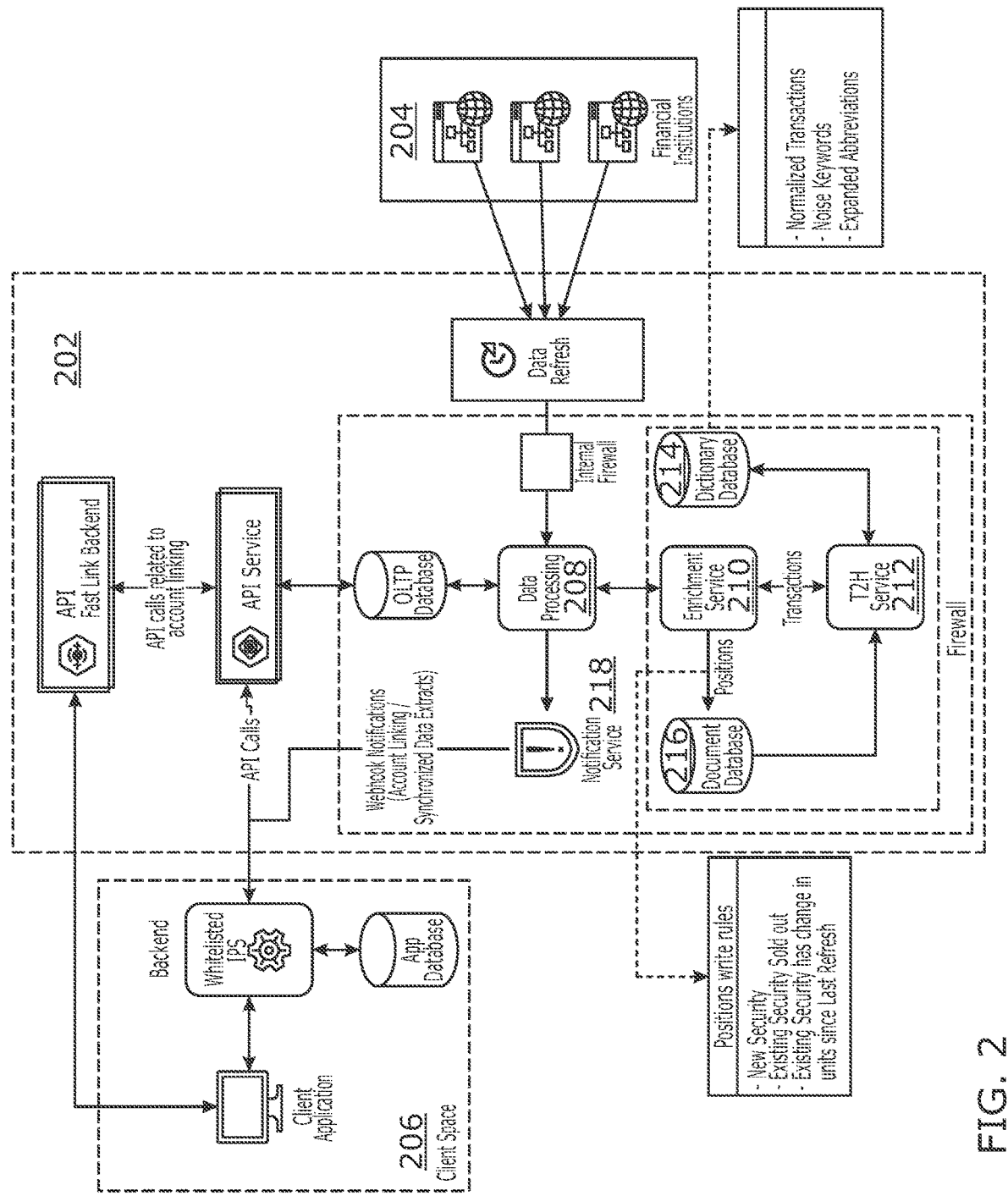
FIG. 2 illustrates a system flow diagram for investment transaction enrichment using transaction to holdings matching, in accordance with one embodiment.

FIG. 2 illustrates a flow diagram of a system 200 for investment transaction enrichment using transaction to holdings matching, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, an investment transaction enrichment sub-system 202 interfaces a plurality of financial institutions 204 and a client-side sub-system 206. The investment transaction enrichment sub-system 202 may also interface an analysis sub-system (not shown) which may process enriched data output by the investment transaction enrichment sub-system 202 for various purposes.

The financial institutions 204 output data defining investment transactions performed by the financial institutions 204. The data defining a particular investment transaction may herein be referred to as investment transaction data. The data may be pushed by the financial institutions 204 to the investment transaction enrichment sub-system 202, for example as a stream or feed of data, in one embodiment. In another embodiment, the data may be retrieved by the investment transaction enrichment sub-system 202 from data structures of the financial institutions 204.

Upon receipt of investment transaction data, the investment transaction enrichment sub-system 202 processes the data using a data processing module 208. The data processing module 208 may process the data to determine whether any values are missing from the data. Missing values may be a result of insufficient information known by the financial institutions 204, a situation wherein the financial institution 204 hasn't posted the security in the investment transactions record, a situation when a holding was bought and sold on the same day and hence, the data refresh did not find the security on the financial institution site/data feed, a situation when a user links a new Investment account with the investment transaction enrichment sub-system 202 and the financial institution provides the historical transactions, but only the current holdings, etc. Of course, even if the values are present in the data, the data processing module 208 may initiate a validation of the data acquired from the financial institutions.

The data processing module 208 may initiate an enrichment service 210 of the investment transaction enrichment sub-system 202. The enrichment service 210 operates to enrich (also referred to as normalize) the data with one or more of the missing values and/or to validate the data acquired from the financial institutions.

The enrichment service 210 initiates a transaction to holding (T2H) service 212. The T2H service 212 first performs a lookup in a dictionary database 214 of already enriched investment transactions. The lookup may use a set of values existing in the data, such as the transaction description, to check in the dictionary database 214 whether a similar investment transaction with a same set of values was previously enriched. The dictionary database 214 may store enriched investment transactions in a map data structure, with the set of values existing in investment transaction data as the key that is correlated with the additional values added to the data via the enrichment process, such as a tuple representing security identifiers as the value. If the lookup succeeds, the investment transaction data is enriched using the value (i.e. the additional values) from the dictionary database 214.

However, if the lookup is unsuccessful, the T2H service 212 uses the data to automatically match the investment transaction to a particular holding. The T2H service 212 may execute one or more matching algorithms to match the investment transaction to a particular holding. Examples of possible matching algorithms that may be used by the T2H service 212 will be provided in more detail below with reference to FIGS. 4-6. In one embodiment, as described below in more detail with reference to FIG. 5, a matching algorithm of the T2H service 212 may use a document database 216 that stores a position history (e.g. holding amounts purchased and/or sold) in order to match the investment transaction to a particular holding or to multiple potential holdings. When multiple matching algorithms are employed, the T2H service 212 may process results of the matching algorithms to determine which particular holding matches the investment transaction.

The T2H service 212 enriches the data with one or more attributes of the matched holding and returns the enriched data to the enrichment service 210. The enriched data is output by the enrichment service 210 to the data processing module 208. The notification service 218 alerts the client side sub-system 206 on the update to the user's aggregated data, following which the client side sub-system 206 can request the API service to return the enriched data. The client-side sub-system 206 may be used to by an entity to link a corresponding investment account of the entity with the investment transaction enrichment sub-system 202.

Figure 3:
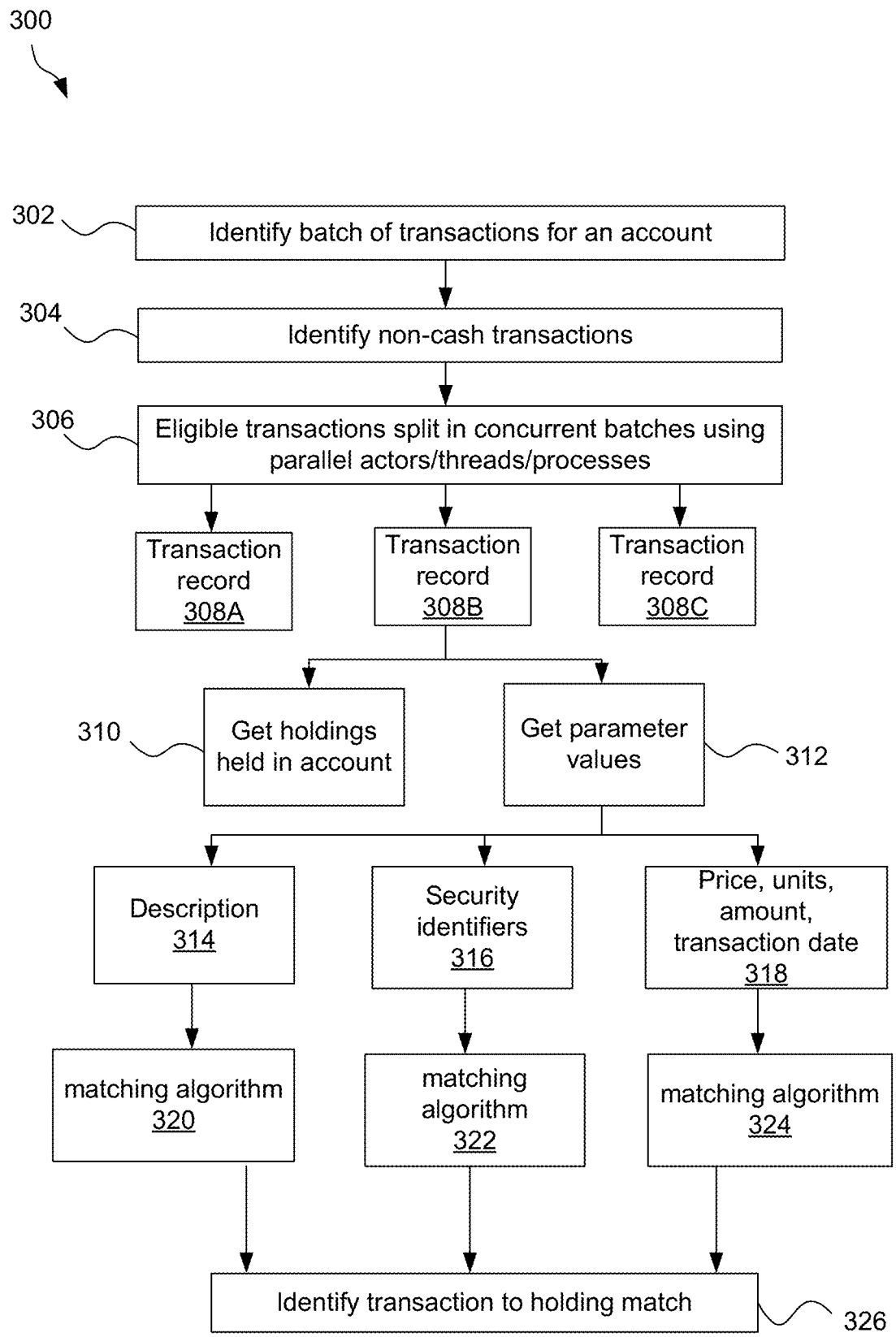
FIG. 3 illustrates a method for investment transaction enrichment using transaction to holdings matching, in accordance with one embodiment.

FIG. 3 illustrates a method 300 for investment transaction enrichment using transaction to holdings matching, in accordance with one embodiment. As an option, the method 300 may be carried out in the context of the details of the previous figure and/or any subsequent figure(s). For example, the method 300 may be carried out by the investment transaction enrichment sub-system 202 of FIG. 2. Of course, however, the method 300 may be carried out in the context of any desired environment. Further, the aforementioned definitions may equally apply to the description below.

In operation 302, a batch of investment transactions for an account are identified. The account refers to an investment account of an entity with a financial institution. In operation 304, non-cash transactions are identified from the batch of investment transactions. The non-cash transactions may be identified based on one or more values stored in the data defining each investment transaction.

In operation 306, eligible transactions (i.e. the non-cash transactions) from the batch are split in concurrent batches using parallel actors/threads/processes. This is shown for example as transaction record 308A-C. Accordingly, method 300 may process the eligible transactions in parallel for enrichment thereof. The remaining operations of the method 300 refer to the operations performed on a particular transaction record 308B.

In parallel, holdings held in the account are obtained (e.g. accessed, read, etc.—see operation 310) and values of parameters of the transaction are obtained from the particular transaction record 308B. As shown, the values that are obtained include a description 314, security identifiers 316, and any combination (tuple) of price, units, amount, and transaction date 318.

Each of the values is used by a respective matching algorithm 320, 322, and 324 to determine one or more potential holdings that match the transaction. Results of the matching algorithms 320, 322, and 324 are output for use in identifying the transaction to holding match in operation 326.

Figure 4:
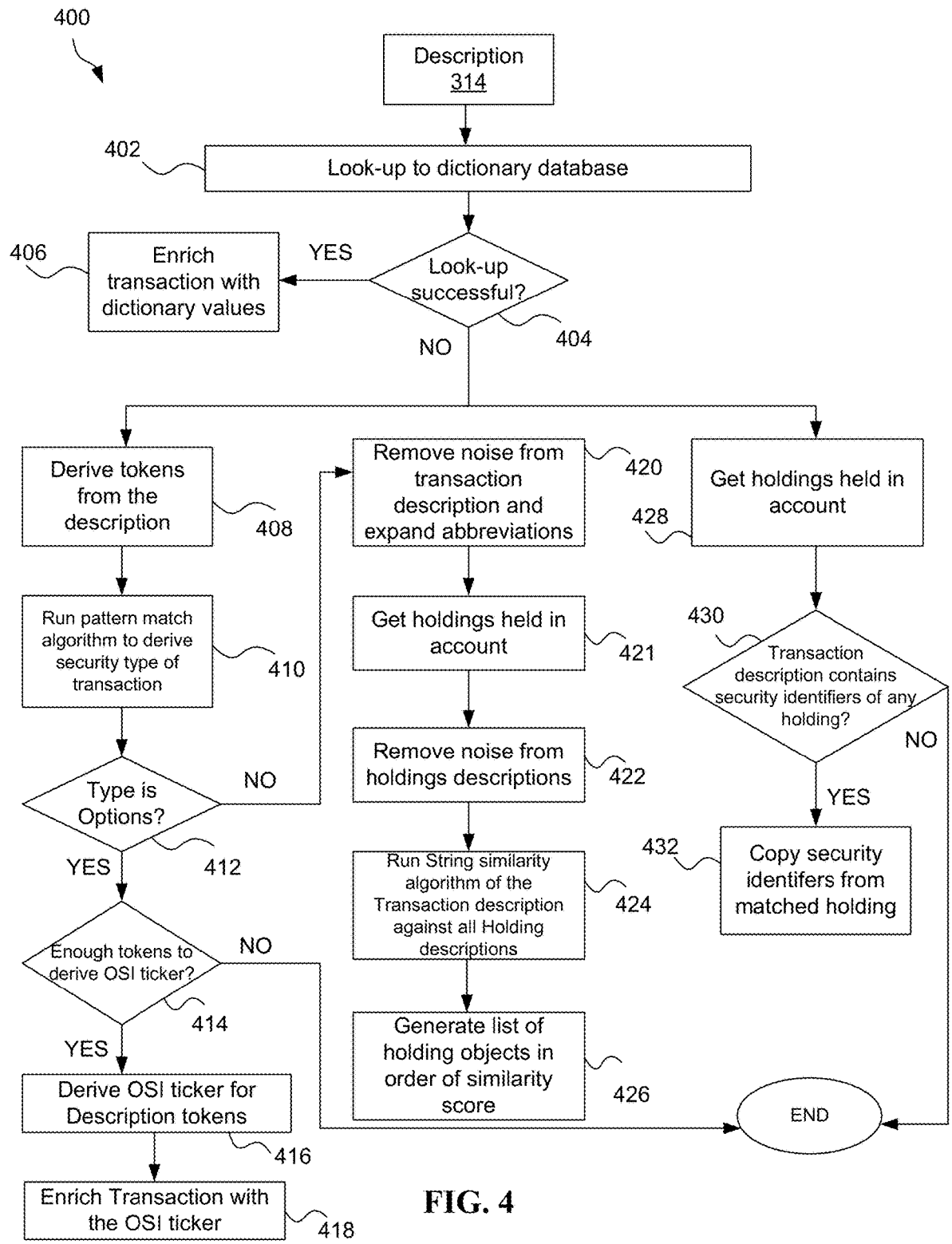
FIG. 4 illustrates a method for using a description existing in investment transaction data to determine at least one potential holding to which the investment transaction corresponds, in accordance with one embodiment.

FIG. 4 illustrates a method 400 for using a description existing in investment transaction data to determine at least one potential holding to which the investment transaction corresponds, in accordance with one embodiment. As an option, the method 400 may be carried out in the context of the details of the previous figure and/or any subsequent figure(s). For example, the method 400 may be carried out by the matching algorithm 320 of FIG. 3. Of course, however, the method 400 may be carried out in the context of any desired environment. Further, the aforementioned definitions may equally apply to the description below.

As shown, the description 314 included in investment transaction data is used to perform a look-up in a dictionary database (e.g. dictionary database 214 of FIG. 2). The dictionary database stores already enriched investment transactions, including correlations between a description of each investment transaction and attributes of holdings used to enrich the data defining the investment transaction. The lookup may use the description to check in the dictionary database whether a similar investment transaction with a same description was previously enriched.

It is determined in decision 404 whether the lookup is successful. If the lookup succeeds, the investment transaction data is enriched using the attributes correlated with the description in the dictionary database, as shown in operation 406. If the lookup is not successful, the method 400 proceeds to perform two matching processes in parallel.

The first matching process includes deriving tokens from the description, as shown in operation 408. A pattern matching algorithm is then used on the tokens to derive a security type of the transaction, as shown in operation 410. The security type may be options, bonds, MMFs, etc. The identification of the type can help narrow down the search to only the appropriate holdings in the account, and/or to derive the security identifier for specific transactions of the type option where it is possible to, using tokens in the description, construct the OSI ticker.

As shown, it is determined in decision 412 whether the holding is of the options type. If it is determined that the holding is of the options type, it is determined in decision 414 whether enough tokens were derived from the description to further derive an OSI ticker. If it is determined that enough tokens were not derived from the description to further derive an OSI ticker, the first matching process of the method 400 ends.

If it is determined that enough tokens were derived from the description to further derive an OSI ticker, the OSI ticker is derived for the tokens, as shown in operation 416. In operation 418, the investment transaction data is enriched with the OSI ticker.

Returning to decision 412, if it is determined that the holding is not of the options type, noise is removed from the description and abbreviations in the description are expanded, as shown in operation 420. In operation 421, holdings held in the account are obtained. In operation 422, noise is removed from descriptions of holdings capable of being matched to the investment transaction.

In operation 424, a string similarity algorithm (i.e. fuzzy string similarity match) of the transaction description is run against all holding descriptions. Similarity scores are determined for transaction/holding pairs, based on the application of the string similarity algorithm. In operation 426, a list of holdings in order of the similarity scores is generated.

The second matching process of the method 400 includes obtaining holdings held in the account, as shown in operation 428. It is determined in decision 430 whether the transaction description contains security identifiers of any of the holdings. If it is determined that the transaction description does not contain security identifiers of any of the holdings, the method 400 ends. If it is determined that the transaction description does contain security identifiers of one of the holdings, the security identifiers are copied from the matched holding for enriching the data defining the investment transaction.

Figure 5:
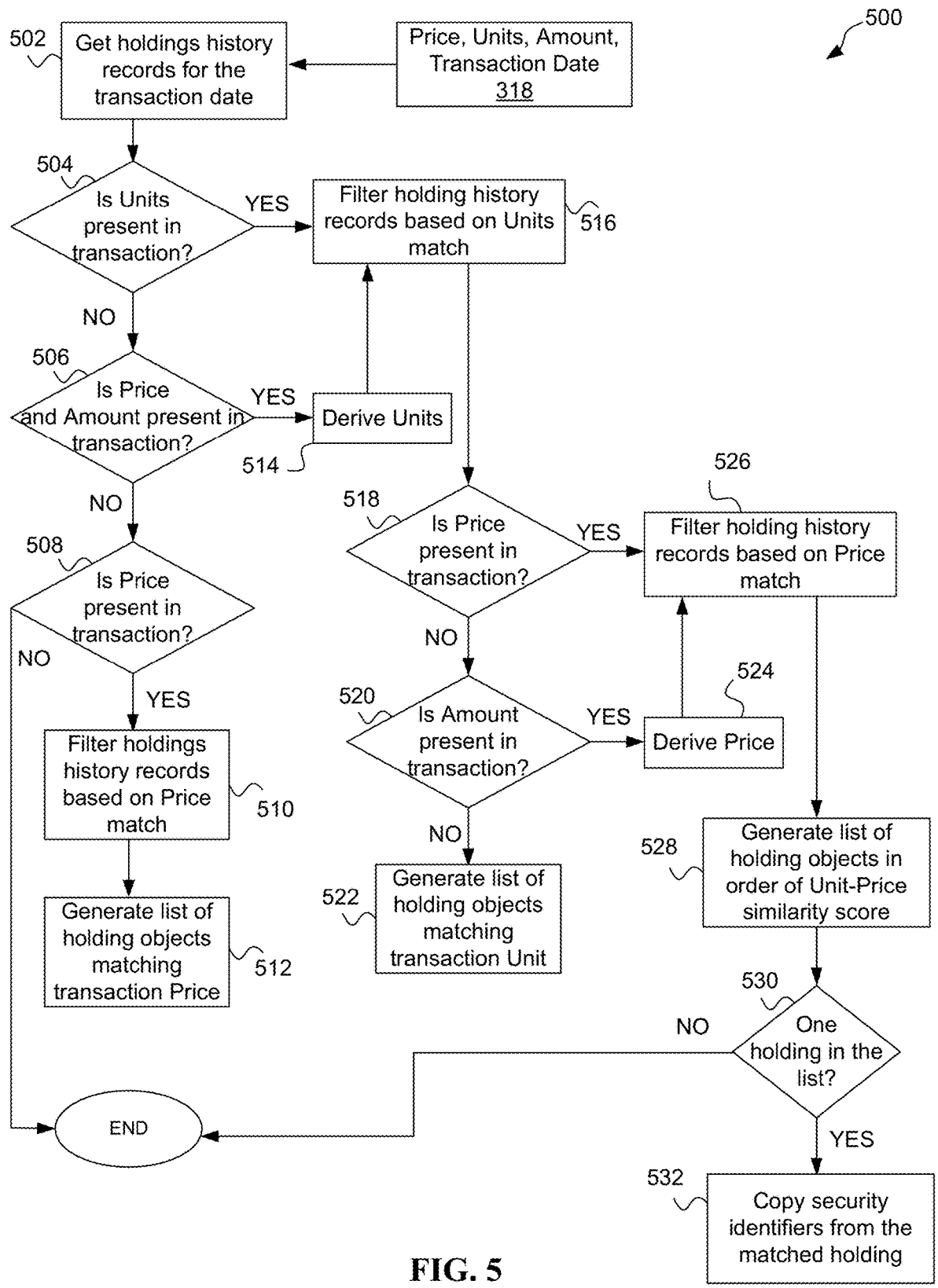
FIG. 5 illustrates a method for using existing price and unit values in investment transaction data to determine at least one potential holding to which the investment transaction corresponds, in accordance with one embodiment.

FIG. 5 illustrates a method 500 for using existing price and unit values in investment transaction data to determine at least one potential holding to which the investment transaction corresponds, in accordance with one embodiment. As an option, the method 500 may be carried out in the context of the details of the previous figure and/or any subsequent figure(s). For example, the method 500 may be carried out by the matching algorithm 324 of FIG. 3. Of course, however, the method 500 may be carried out in the context of any desired environment. Further, the aforementioned definitions may equally apply to the description below.

As shown, any combination (tuple) of price, units, amount, and transaction date 318 included in investment transaction data is used as input to the method 500. As an option, since the prices of holdings in an account reflect the end-of-day price, the price included in investment transaction data may be adjusted to allow a variance of a defined threshold (e.g. based on the type of holding).

In operation 502, holdings history records for the transaction date included in the input 318 are obtained (e.g. from position history in document database 216 of FIG. 2). Thus, the holdings history records may be filtered by the transaction date included in the investment transaction data.

In decision 504 it is determined whether the units (value) is present in the investment transaction data. If it is determined that the units is not present in the investment transaction data, it is next determined in decision 506 whether a price (value) and amount (value) is present in the investment transaction data. If it is determined that the price and amount are not present in the investment transaction data, it is next determined in decision 508 whether just the price (value) is present in the investment transaction data. If it is determined that the price is not present in the investment transaction data, the method 500 ends.

If it is determined that the price is present in the investment transaction data, the holdings history records obtained in operation 502 are filtered based on a price match, as shown in operation 510. A list of holdings matching the price is then generated, as shown in operation 512.

Returning to decision 506, if it is determined that the price and amount are present in the investment transaction data, then the units are derived based on the price and amount, as shown in operation 514. Once the units are derived, or if it is determined in decision 504 that the units is already present in the investment transaction data, the holdings history records obtained in operation 502 are filtered based on a units match, as shown in operation 516.

It is then determined in decision 518 whether the price (value) is present in the investment transaction data. If it is determined that the price is not is present in the investment transaction data, it is further determined in decision 520 whether the amount (value) is present in the investment transaction data. If it is determined that the amount is not present in the investment transaction data, a list of holdings matching the units is then generated, as shown in operation 522.

If it is determined that the amount is present in the investment transaction data, the price is derived using the amount, as shown in operation 524. Once the price is derived, or if it is determined in decision 518 that the price already exists in the investment transaction data, then the holdings history records obtained in operation 502 are filtered based on a price match, as shown in operation 526. A list of holdings matching the unit and price is then generated, as shown in operation 528.

In decision 528 it is determined whether the list includes just one holding. If it is determined that the list includes just one holding, security identifiers from the matched holding are copied from the matched holding for enriching the data defining the investment transaction, as shown in operation 532.

Figure 6:
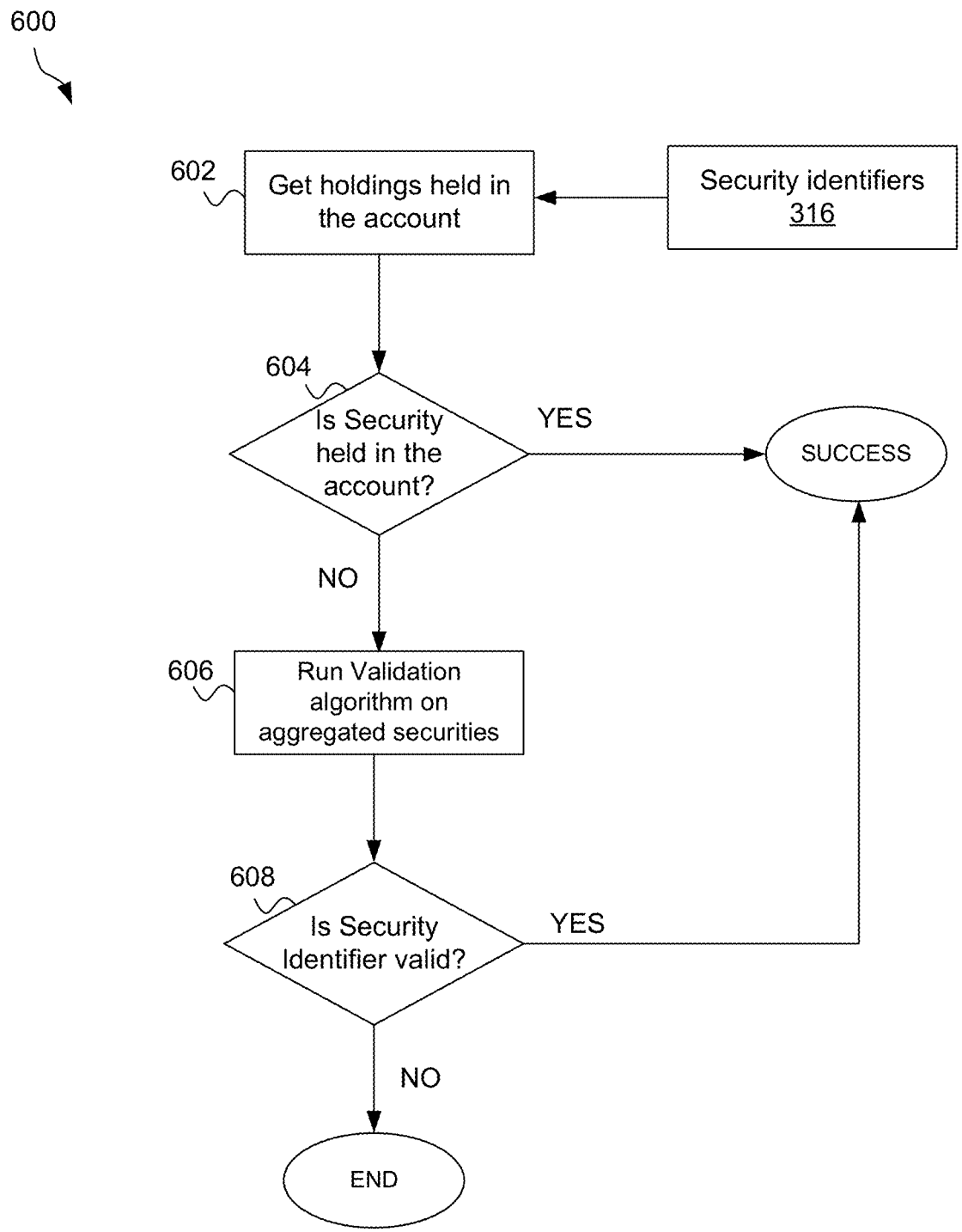
FIG. 6 illustrates a method for validating existing security identifier in investment transaction data, in accordance with one embodiment.

FIG. 6 illustrates a method 600 for validating existing security identifier in investment transaction data, in accordance with one embodiment. As an option, the method 600 may be carried out in the context of the details of the previous figure and/or any subsequent figure(s). For example, the method 600 may be carried out by the matching algorithm 322 of FIG. 3. Of course, however, the method 600 may be carried out in the context of any desired environment. Further, the aforementioned definitions may equally apply to the description below.

As shown, security identifiers 316 included in investment transaction data are used as input to the method 600. In operation 602, holdings held in an account of an entity associated with the investment transaction data are obtained. It is determined in decision 604 whether a security (holding) identified by the security identifiers 316 is held in the account. If it is determined that a security identified by the security identifiers 316 is held in the account, then the aggregation of the investment transaction data is determined to be valid.

If it is determined that a security identified by the security identifiers 316 is not held in the account, a validation algorithm is run on aggregated securities, as shown in operation 606. Based on a result of the validation algorithm, it is determined in decision 608 whether each security identifier is valid. If it is determined that the security identifiers are valid, then the aggregation of the investment transaction data is determined to be valid. Otherwise, if it is determined that the security identifiers are not valid, then the method 600 ends. In this way, the method 600 may rule out errors in an aggregation process when the investment transaction data has security identifiers (e.g. acquired from the financial institution).

Figure 7:
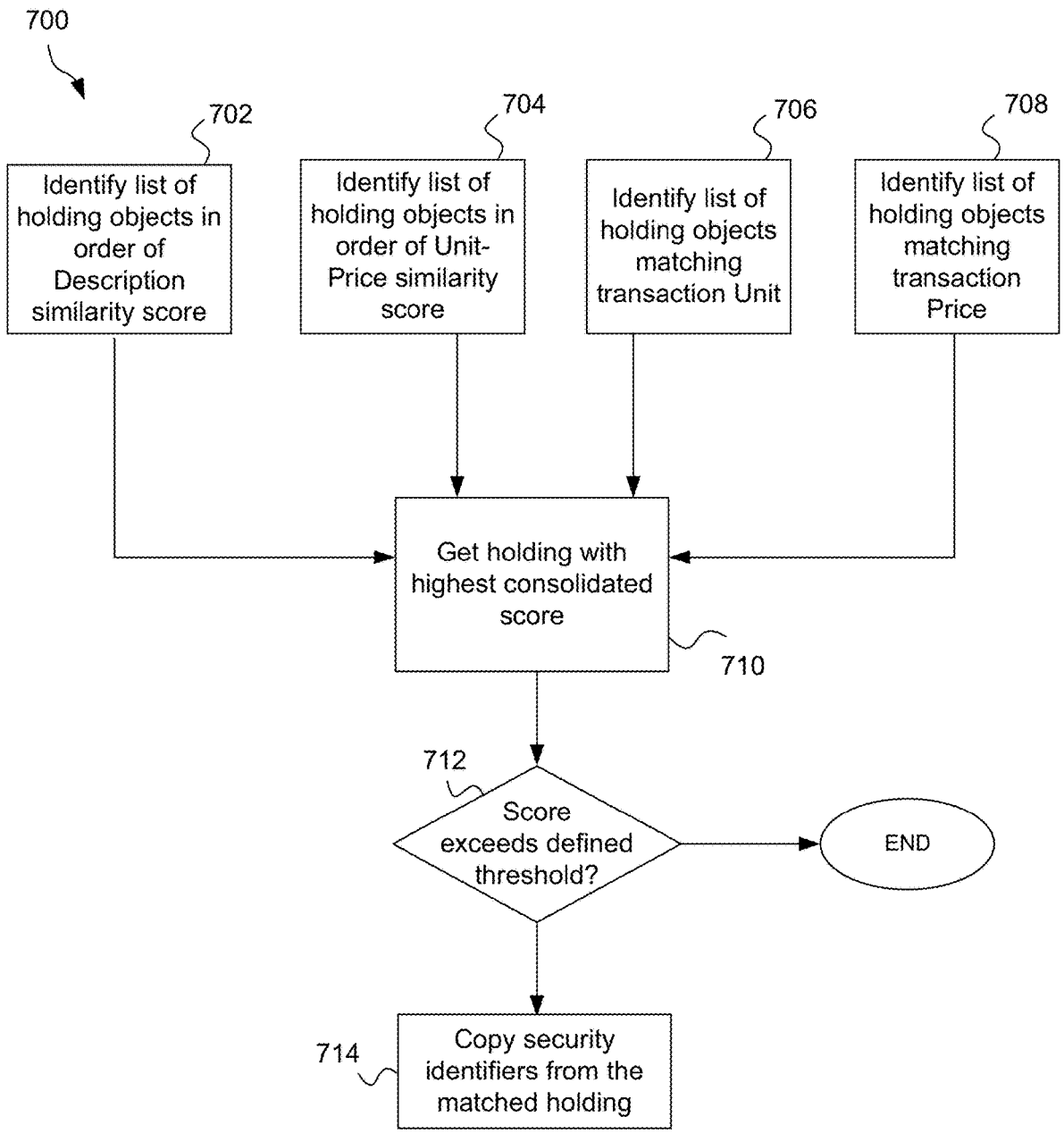
FIG. 7 illustrates a method for matching an investment transaction to a particular holding selected from one or more potential holdings determined using one or matching algorithms, in accordance with one embodiment.

FIG. 7 illustrates a method 700 for matching an investment transaction to a particular holding selected from one or more potential holdings determined using one or matching algorithms, in accordance with one embodiment. As an option, the method 700 may be carried out in the context of the details of the previous figure and/or any subsequent figure(s). For example, the method 700 may be carried out during operation 326 of FIG. 3. Of course, however, the method 700 may be carried out in the context of any desired environment. Further, the aforementioned definitions may equally apply to the description below.

As shown, input is provided which includes a list of holdings in order of a description similarity score (e.g. as created in operation 426 of FIG. 4), a list of holdings in order of a unit-price similarity score (e.g. as created in operation 528 of FIG. 5), a list of holdings matching units in the investment transaction data (e.g. as created in operation 522 of FIG. 5), and a list of holdings matching a price in the investment transaction data (e.g. as created in operation 512 of FIG. 5). Based on the input, a holding with a highest consolidated score is determined, as shown in operation 710.

It is determined in decision 712 whether the score of the determined holding exceeds a defined threshold. If it is determined that the score does not exceed the defined threshold, the method 700 ends, such that no transaction/holding match is found. If it is determined that the score exceeds the defined threshold, security identifiers are copied from the matched holding, as shown in operation 714, for use in enriching the investment transaction data.

Figure 8:
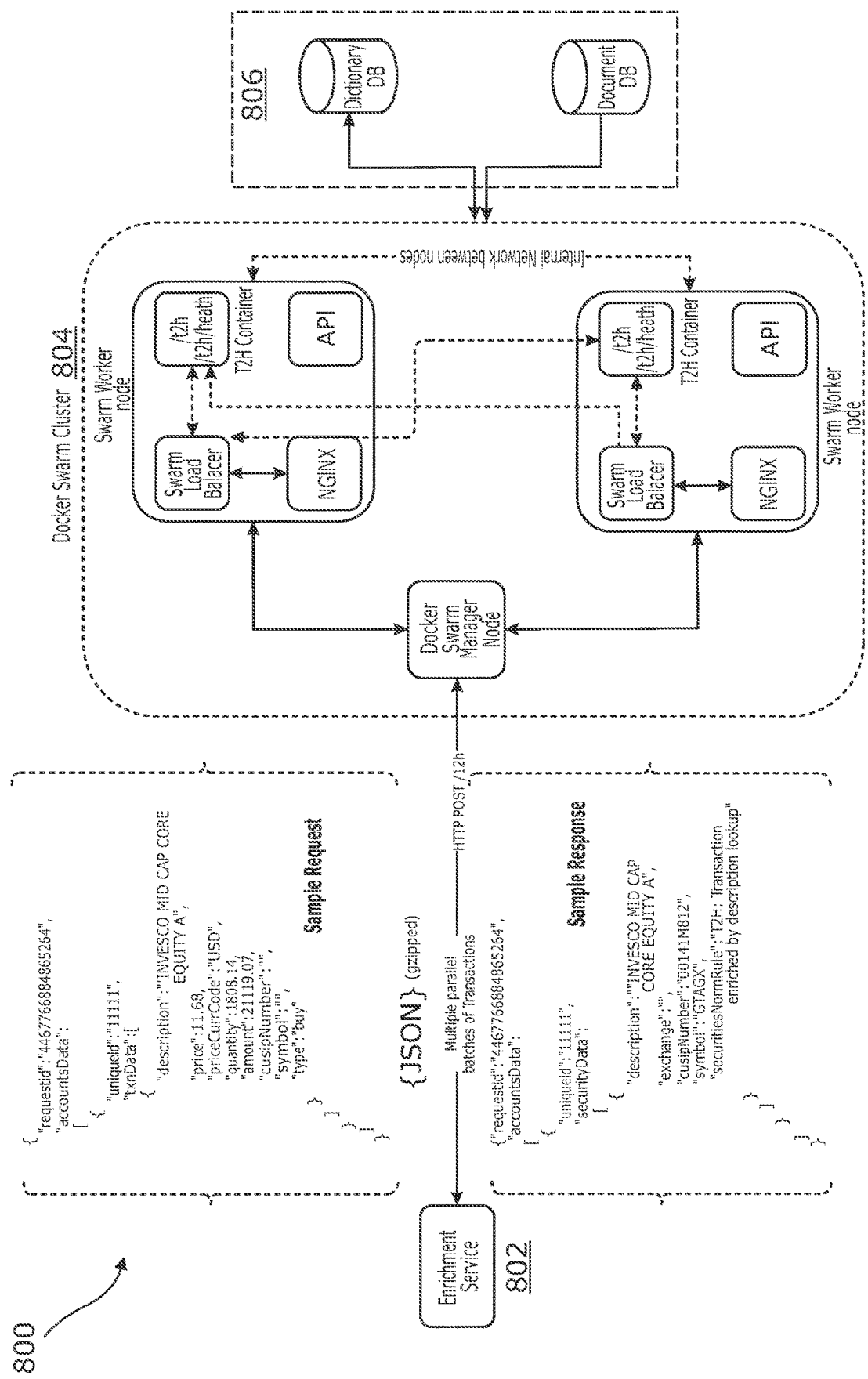
FIG. 8 illustrates a system for deploying a process to perform investment transaction enrichment, in accordance with one embodiment.

FIG. 8 illustrates a system 800 for deploying a process to perform investment transaction enrichment, in accordance with one embodiment. As an option, the method 800 may be implemented in the context of the details of the previous figure and/or any subsequent figure(s). For example, the system 800 may be implemented by the investment transaction enrichment sub-system 202 of FIG. 2. Of course, however, the system 800 may be carried out in the context of any desired environment. Further, the aforementioned definitions may equally apply to the description below.

The enrichment service 802 (e.g. 210 of FIG. 2) makes a hypertext transfer protocol (HTTP) Post call to the T2H service (e.g. 212 of FIG. 2). The T2H service is hosted in a Docker Swarm cluster 804. The Docker manager routes the HTTP request to one of the available Docker Swarm nodes (worker nodes). Each worker node can host a single or multiple instances (containers) of the T2H service. The worker node also hosts NGINX, which includes in its configuration the virtual internet protocol (VIP) of the T2H service (instead of individual).

A Swarm load balancer on the node routes the request to NGINX. NGINX processes the request and routes it to the VIP for the T2H service. The Swarm load balancer then routes the request to one of the containers for the T2H service, on any of the worker nodes.

The T2H service also exposes an endpoint for health check of the API.

The T2H services determine transaction to holding matches for the investment transaction data. The T2H services communicate with a data layer 806 having a dictionary database (e.g. 214 of FIG. 2) and document database (e.g. 216 of FIG. 2), for use in determining the transaction to holding matches for the investment transaction data. The T2H services use the transaction to holding matches to enrich the investment transaction data.

FIGS. 9A-E illustrate an exemplary implementation of the method 100 of FIG. 1. As shown in FIG. 9A, an investment transaction record is received without values in the CUSIP and Ticker fields. In one embodiment, the transaction description of the investment transaction record (and holdings descriptions of holdings held in an account) may be normalized. In FIGS. 9B-D, the investment transaction record of FIG. 9A is matched to a holding based on similarities between a plurality of different parameters, including a price match (FIG. 9B), a unit match (FIG. 9C), and a description match (FIG. 9D). Once the investment transaction record is matched to the holding, the investment transaction record is enriched using the matched holding, which as shown in FIG. 9E includes populating the CUSIP and Ticker fields of the with investment transaction record values of the CUSIP and Ticker fields included in the matched holding.

For example, due to limited information available at the financial institution source, aggregated transactions often come through with abbreviated or unclear descriptions and no CUSIP or Ticker. As shown in the present example of FIG. 9A, the investment transaction data record includes a CUSIP field and ticker field with missing values.

Utilizing pattern-based identification of holding descriptions, the partial transaction, as well as holdings descriptions from positions held in the account, are cross-referenced against a dictionary of keywords and abbreviations to identify (normalize) the fully articulated description for each. The normalized descriptions can be used to parse out and extract the security identifiers. These extracted identifiers can then be cross-referenced against holdings in the account to identify matches between transactions and holdings. In any case, the normalized descriptions allow similarities or "matches" between the positions held in the account and the transaction description to be found.

After narrowing the search field of potential holdings, a detailed position analysis can be used to narrow the results down even further. By identifying daily changes in position quantity and market value, the type of transaction activity and descriptive details attributed to those changes can be determined. Additional transaction data points such as price can also be derived to validate the matched data when necessary. Once an exact holding and transaction match is identified, the missing CUSIP and ticker fields can be populated to create a complete and accurate transaction record.

Use Case—Integration with Complex Portfolio Accounting Systems

Many wealth managers and advisors rely on complex portfolio accounting systems to generate holistic, quality performance reporting and analyses for their clients. Position quantities and market values that are reconciled against the data source and day-to-day variations in these holdings should have direct correlation to the transactions that occurred in the account. When the unique global security identifiers are inaccurate, impartial, or simply missing in either holdings or transactions, the reconciliation process becomes extremely difficult. This often creates a burden on resources and additional overhead to manually research, identify, and correct missing data points in order to successfully reconcile the accounts. Additionally, transaction-based portfolio accounting systems rely on the proper identification of transaction holdings and activity types to calculate performance returns for investment accounts. The transaction to holding matching process of the present description increases the accuracy of data input for Portfolio Accounting Systems and allows for greater automation in the reconciliation and performance computation processes to reduce unnecessary overhead.

Use Case—Compliance Tracking

SEC regulatory requirements and the ever-increasing presence of data availability in the wealth industry creates a need for compliance monitoring to ensure firms remain diligent in their data security and trading models. The transaction to holding matching process of the present description enhances the identification of security-specific trades and supports use cases such as monitoring for insider trading, employee trading during blackout periods, and more.

Use Case—Seamless Integration with Downstream Applications

In addition to performance-based output, transaction data is often fed into downstream applications, including financial planning/wellness tools and client portals. Accurate representation of transaction history is key not only to enhancing the end-user experience, but to providing wealth managers and advisors with the framework to develop strategic investment strategies and financial modeling for their clients. Tracking these money and security movements is critical to ensuring they remain on target for client goals.

Use Case—Trade Reconciliation

Trading and rebalancing are core to wealth management operations. Strategically placed trades are critical for maintaining alignment with clients' investment strategies and financial goals. Whether processed manually or via automated tooling, it is crucial to monitor transaction activity for accuracy during and post-trade execution in order to minimize risk exposure and comply with regulatory requirements. Trade reconciliation is a process that matches and reconciles trades between trading systems/custodial books of record and the transaction data after it has been processed. Utilizing the transaction to holding matching process of the present description, proper security identification in transaction data can be ensured to make reconciliation as seamless as possible.

Figure 10:
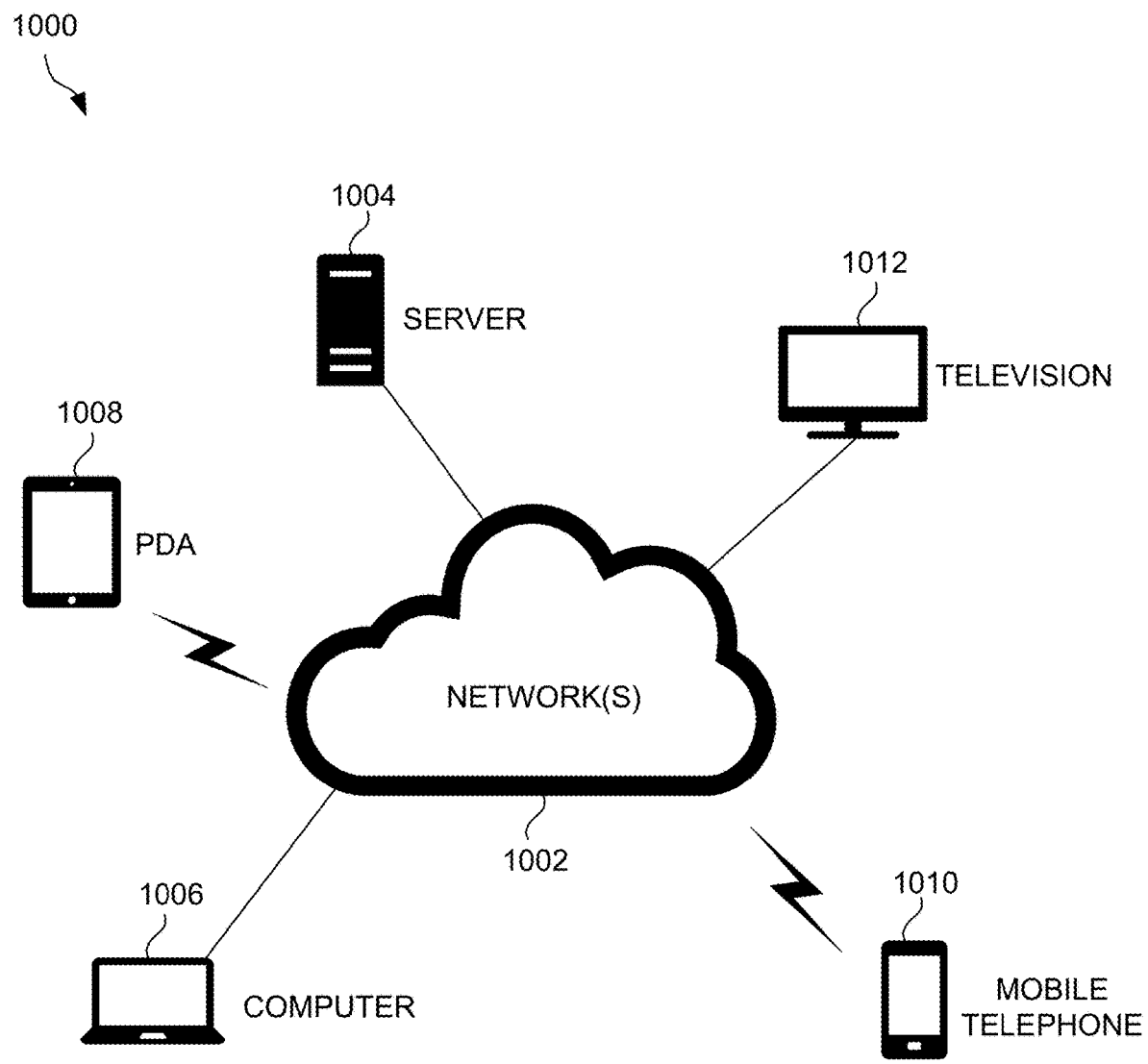
FIG. 10 illustrates a network architecture, in accordance with one possible embodiment.

FIG. 10 illustrates a network architecture 1000, in accordance with one possible embodiment. As shown, at least one network 1002 is provided. In the context of the present network architecture 1000, the network 1002 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1002 may be provided.

Coupled to the network 1002 is a plurality of devices. For example, a server computer 1004 and an end user computer 1006 may be coupled to the network 1002 for communication purposes. Such end user computer 1006 may include a desktop computer, lap-top computer, and/or any other type of logic. Still yet, various other devices may be coupled to the network 1002 including a personal digital assistant (PDA) device 1008, a mobile phone device 1010, a television 1012, etc.

Figure 11:
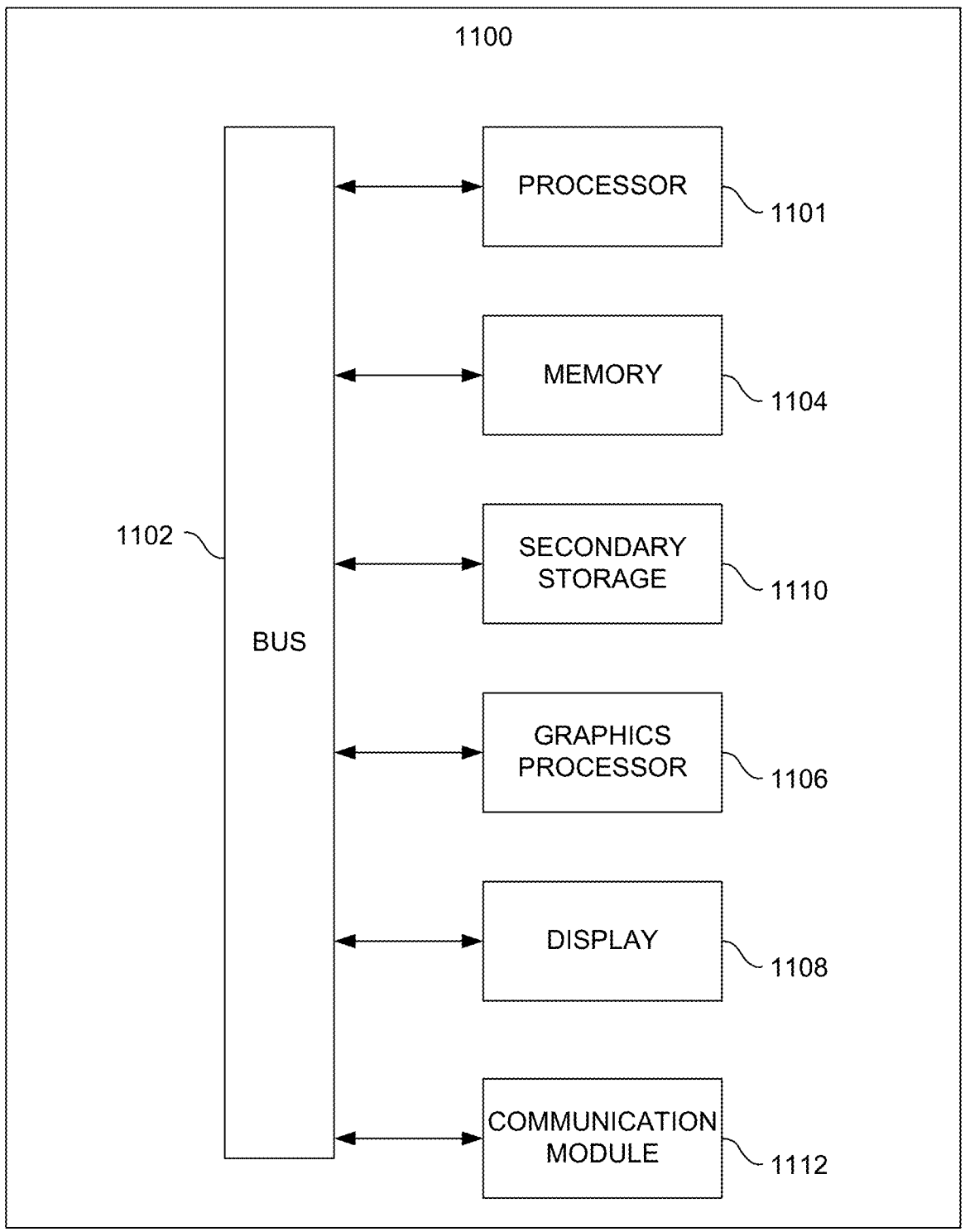
FIG. 11 illustrates an exemplary system, in accordance with one embodiment.

FIG. 11 illustrates an exemplary system 1100, in accordance with one embodiment. As an option, the system 1100 may be implemented in the context of any of the devices of the network architecture 1000 of FIG. 10. Of course, the system 1100 may be implemented in any desired environment.

As shown, a system 1100 is provided including at least one central processor 1101 which is connected to a communication bus 1102. The system 1100 also includes main memory 1104 [e.g. random access memory (RAM), etc.]. The system 1100 also includes a graphics processor 1106 and a display 1108.

The system 1100 may also include a secondary storage 1110. The secondary storage 1110 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 1104, the secondary storage 1110, and/or any other memory, for that matter. Such computer programs, when executed, enable the system 1100 to perform various functions (as set forth above, for example). Memory 1104, storage 1110 and/or any other storage are possible examples of non-transitory computer-readable media.

The system 1100 may also include one or more communication modules 1112. The communication module 1112 may be operable to facilitate communication between the system 1100 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:

identify a record created for an investment transaction, the record including data defining the investment transaction, wherein the investment transaction was performed for an entity, and wherein the record is missing values in a Committee on Uniform Securities Identification Procedures (CUSIP) field and a Ticker field;

use the data included in the record to automatically match the investment transaction to a particular holding of a plurality of holdings of the entity to which the investment transaction corresponds, including:

applying one or more matching algorithms to the data and the plurality of holdings of the entity to determine which of the plurality of holdings of the entity are potential holdings to which the investment transaction corresponds, wherein the one or more matching algorithms return an indication of the potential holdings each with a corresponding similarity score, wherein applying the one or more matching algorithms to the data and the plurality of holdings of the entity to determine which of the plurality of holdings of the entity are potential holdings to which the investment transaction corresponds includes:

deriving tokens from a description included in the record, and applying a first matching algorithm which derives a security type of the investment transaction from the tokens, matches the security type of investment transaction to one or more of the plurality of holdings, and uses a string similarity algorithm to determine similarity between the description included in the record and descriptions included in the one or more of the plurality of holdings matching the security type of the investment transaction, and automatically matching the investment transaction to one of the potential holdings with a highest corresponding similarity score;

enrich the record with one or more attributes of the particular holding by adding the one or more attributes of the particular holding to the record, wherein the one or more attributes of the particular holding that are added to the record include a Committee on Uniform Securities Identification Procedures (CUSIP) value and a Ticker value which are added to the CUSIP field and the Ticker field, respectively, of the record;

based on the matching between the investment transaction and the particular holding, store, in a map data structure, a correlation between existing values in the data associated with one or more parameters of the investment transaction and the one or more attributes of the particular holding;

identify an additional record that defines an additional investment transaction;

determine that the additional record has values for the one or more parameters that match the existing values stored in the map data structure; and based on the correlation in the map data structure of the existing values with the one or more attributes of the particular holding, automatically enrich the additional record with the one or more attributes;

wherein the record and the additional record are enriched for being reconciled with the investment data of one or more other systems.

2. The non-transitory computer-readable media of claim 1, wherein the data is included in an aggregated investment transaction.

3. The non-transitory computer-readable media of claim 1, wherein the record is identified from a data structure of a financial institution through which the investment transaction was performed.

4. The non-transitory computer-readable media of claim 1, wherein the record is identified responsive to receipt of a data feed including the record from a financial institution through which the investment transaction was performed.

5. The non-transitory computer-readable media of claim 1, further comprising:
  determining that a value for one or more parameters of the investment transaction is missing from the record;
  wherein the automatic matching of the investment transaction to the particular holding and the enriching of the record is performed responsive to determining that the value for the one or more parameters of the investment transaction is missing from the record.

6. The non-transitory computer-readable media of claim 1, wherein a matching algorithm of the one or more matching algorithms uses an existing description in the data to determine which of the plurality of holdings of the entity are potential holdings to which the investment transaction corresponds.

7. The non-transitory computer-readable media of claim 1, wherein a matching algorithm of the one or more matching algorithms uses at least an existing price value in the data and an existing unit value in the data to determine which of the plurality of holdings of the entity are potential holdings to which the investment transaction corresponds.

8. The non-transitory computer-readable media of claim 1, wherein a matching algorithm of the one or more matching algorithms uses an existing security identifier in the data to determine which of the plurality of holdings of the entity are potential holdings to which the investment transaction corresponds.

9. The non-transitory computer-readable media of claim 1, wherein the device is further caused to:
  output the enriched record and the additional record for being reconciled with the investment data of the one or more other systems.

10. The non-transitory computer-readable media of claim 1, wherein the map data structure is used to enrich the additional record, which avoids use of the one or more matching algorithms in matching the additional record to the particular holding.

11. The non-transitory computer-readable media of claim 1, wherein determining that the additional record has values for the one or more parameters that match the existing values stored in the map data structure includes:
  performing a lookup in the map data structure using the values in the additional record,
  wherein the lookup returns the correlation of the existing values with the one or more attributes of the particular holding.

12. The non-transitory computer-readable media of claim 11, wherein the values in the additional record include a description included in the additional record, such that the description in the additional record is used to perform a lookup in the map data structure of holding attributes that have already been correlated with the description.

13. The non-transitory computer-readable media of claim 1, wherein applying the one or more matching algorithms to the data and the plurality of holdings of the entity to determine which of the plurality of holdings of the entity are potential holdings to which the investment transaction corresponds further includes:
  applying a second matching algorithm that determines whether the description included in the record contains security identifiers of any of the plurality of holdings.

14. The non-transitory computer-readable media of claim 1, wherein the device is further caused to:
  reconcile the enriched record and the enriched additional record with the investment data of the one or more other systems.

15. A method, comprising:
at a computer system:
  identifying transaction, wherein the investment transaction was performed for an entity, and wherein the record is missing values in a Committee on Uniform Securities Identification Procedures (CUSIP) field and a Ticker field;
  using the data included in the record to automatically match the investment transaction to a particular holding of a plurality of holdings of the entity to which the investment transaction corresponds, including:
    applying one or more matching algorithms to the data and the plurality of holdings of the entity to determine which of the plurality of holdings of the entity are potential holdings to which the investment transaction corresponds, wherein the one or more matching algorithms return an indication of the potential holdings each with a corresponding similarity score, wherein applying the one or more matching algorithms to the data and the plurality of holdings of the entity to determine which of the plurality of holdings of the entity are potential holdings to which the investment transaction corresponds includes:
      deriving tokens from a description included in the record, and
      applying a first matching algorithm which derives a security type of the investment transaction from the tokens, matches the security type of investment transaction to one or more of the plurality of holdings, and uses a string similarity algorithm to determine similarity between the description included in the record and descriptions included in the one or more of the plurality of holdings matching the security type of the investment transaction, and
    automatically matching the investment transaction to one of the potential holdings with a highest corresponding similarity score;
  enriching the record with one or more attributes of the particular holding by adding the one or more attributes of the particular holding to the record, wherein the one or more attributes of the particular holding that are added to the record include a Committee on Uniform Securities Identification Procedures (CUSIP) value and a Ticker value which are added to the CUSIP field and the Ticker field, respectively, of the record;

based on the matching between the investment transaction and the particular holding, storing, in a map data structure, a correlation between existing values in the data associated with one or more parameters of the investment transaction and the one or more attributes of the particular holding;

identifying an additional record that defines an additional investment transaction;

determining that the additional record has values for the one or more parameters that match the existing values stored in the map data structure; and based on the correlation in the map data structure of the existing values with the one or more attributes of the particular holding, automatically enriching the additional record with the one or more attributes;

wherein the record and the additional record are enriched for being reconciled with the investment data of one or more other systems.

16. A system, comprising:

a non-transitory memory storing instructions; and one or more processors in communication with the non-transitory memory that execute the instructions to:

identify a record created for an investment transaction, the record including data defining the investment transaction, wherein the investment transaction was performed for an entity, and wherein the record is missing values in a Committee on Uniform Securities Identification Procedures (CUSIP) field and a Ticker field;

use the data included in the record to automatically match the investment transaction to a particular holding of a plurality of holdings of the entity to which the investment transaction corresponds, including:

applying one or more matching algorithms to the data and the plurality of holdings of the entity to determine which of the plurality of holdings of the entity are potential holdings to which the investment transaction corresponds, wherein the one or more matching algorithms return an indication of the potential holdings each with a corresponding similarity score, wherein applying the one or more matching algorithms to the data and the plurality of holdings of the entity to determine which of the plurality of holdings of the entity are potential holdings to which the investment transaction corresponds includes:

deriving tokens from a description included in the record, and applying a first matching algorithm which derives a security type of the investment transaction from the tokens, matches the security type of investment transaction to one or more of the plurality of holdings, and uses a string similarity algorithm to determine similarity between the description included in the record and descriptions included in the one or more of the plurality of holdings matching the security type of the investment transaction, and automatically matching the investment transaction to one of the potential holdings with a highest corresponding similarity score;

enrich the record with one or more attributes of the particular holding by adding the one or more attributes of the particular holding to the record, wherein the one or more attributes of the particular holding that are added to the record include a Committee on Uniform Securities Identification Procedures (CUSIP) value and a Ticker value which are added to the CUSIP field and the Ticker field, respectively, of the record;

based on the matching between the investment transaction and the particular holding, store, in a map data structure, a correlation between existing values in the data associated with one or more parameters of the investment transaction and the one or more attributes of the particular holding;

identify an additional record that defines an additional investment transaction;

determine that the additional record has values for the one or more parameters that match the existing values stored in the map data structure; and based on the correlation in the map data structure of the existing values with the one or more attributes of the particular holding, automatically enrich the additional record with the one or more attributes;

wherein the record and the additional record are enriched for being reconciled with the investment data of one or more other systems.

\* \* \* \* \*